United States Patent [19]

Kimura et al.

[11] Patent Number: 4,971,859
[45] Date of Patent: Nov. 20, 1990

[54] ADHESIVELY BONDED STRUCTURE BETWEEN DYNAMIC POWER DETECTING ELEMENT AND OBJECT TO BE DETECTED

[75] Inventors: Naomasa Kimura; Minako Onodera; Jun Sasahara; Tomoyuki Fukumaru, all of Saitama, Japan

[73] Assignee: Honda Giken Kogyo Kabushiki Kaisha, Tokyo, Japan

[21] Appl. No.: 310,546

[22] Filed: Feb. 13, 1989

[30] Foreign Application Priority Data

Feb. 18, 1988 [JP] Japan .................................. 63-34081
Aug. 12, 1988 [JP] Japan .................................. 63-201097

[51] Int. Cl.$^5$ ................................................ G01L 3/02
[52] U.S. Cl. ....................................... 428/325; 428/245; 428/292; 428/295; 428/416; 428/900; 73/862.19; 73/862.36; 324/209
[58] Field of Search ................ 428/225, 245, 250, 292, 428/295, 325, 336, 416, 608, 692, 900; 73/862.19, 862.36, DIG. 2; 427/207.1; 324/209

[56] References Cited

U.S. PATENT DOCUMENTS

| | | | |
|---|---|---|---|
| 3,465,581 | 9/1969 | Hohenberg | 73/862.36 |
| 4,414,855 | 11/1983 | Iwasaki | 73/862.36 |
| 4,740,416 | 4/1988 | DeCoste, Jr. et al. | 428/240 |
| 4,740,947 | 4/1988 | Ohta et al. | 369/286 |
| 4,784,003 | 11/1988 | Kimura et al. | 73/862.36 |

FOREIGN PATENT DOCUMENTS

0102129 6/1984 Japan .................................. 72/862.36

Primary Examiner—George F. Lesmes
Assistant Examiner—Christopher Brown
Attorney, Agent, or Firm—Lyon & Lyon

[57] ABSTRACT

In an adhesively bonded structure between a dynamic power detecting element and an object to be detected, an adhesive bond bonding the dynamic power detecting element formed of a ferromagnetic material with the object to be detected is formed of an adhesive and an inorganic filler having a small linear thermal expansion coefficient and incorporated in the adhesive.

13 Claims, 6 Drawing Sheets

ADHESIVELY BONDED STRUCTURE BETWEEN DYNAMIC POWER DETECTING ELEMENT AND OBJECT TO BE DETECTED

BACKGROUND OF THE INVENTION

1. Field of the Invention

The present invention relates to an adhesively bonded structure between a dynamic power detecting element and an object to be detected, and more particularly, to an improvement of an adhesively bonded structure in which a dynamic power detecting element formed of a ferromagnetic material is adhesive bonded to an object to be detected through an adhesive bond.

2. DESCRIPTION OF THE PRIOR ART

The dynamic power detecting element has been conventionally adhesively bonded to an object to be detected through an adhesive bond formed of an adhesive alone (for example, see Japanese Patent Application Laid-open No. 182630/62).

Some ferromagnetic materials have a positive magnetostriction, e,g., amorphous alloys produce a phenomenon that when a tensile is applied thereto the magnetic resilience in a direction of such tension is reduced to facilitate the magnetization in such direction, i.e., a so-called stress-magnetization effect. When the torque of a rotating shaft, which is an object to be detected, is detected by utilizing this stress-magnetization effect, a strain produced in the rotating shaft is introduced to a torque detecting element serving as a dynamic power detecting element made from a thin amorphous alloy strip to detect the torque. Therefore, it is desirable that the adhesive bond is thin and uniform in thickness over the entire length thereof.

However, if an adhesive bond is formed from an adhesive alone as described above, the adhesive bond is difficult to be formed into a decreased and uniform thickness, resulting in problems of a dispersion of torque detected values, a reduction in detecting sensitivity of the torque detecting element and so on.

In addition, the torque detecting element is required to exhibit a rectilinear torque-output characteristic irrespective of temperature conditions, but there is also the following problem: The above-described adhesive is commonly formed from a synthetic resin and hence, has a large linear thermal expansion coefficient peculiar to the resin. Consequently, the torque detecting element is subjected to influences of shrinkage and expansion of the adhesive bond in increased and decreased temperatures to lose the linearity of the torque-output characteristic.

SUMMARY OF THE INVENTION

The present invention has been accomplished with the foregoing in view, and it is an object of the present invention to provide an adhesively bonded structure of the type described above, in which an adhesive bond lying between the dynamic detecting element and the object to be detected is formed to be thin and uniform over the entire length thereof.

It is another object of the present invention to provide an adhesively bonded structure of the type described above, which has an adhesive bond having a small linear thermal expansion coefficient.

To attain the above objects, according to the present invention, there is provided an adhesively bonded structure between a dynamic power detecting element and an object to be detected, in which an adhesive bond bonding the dynamic power detecting element formed of a ferromagnetic material with the object to be detected is formed of an adhesive and an inorganic filler in the form of a large number of substantially uniform diameter microspheres dispersed in the adhesive without overlapping one on another between the dynamic power detecting element and the object.

In addition, according to the present invention, there is provided an adhesively bonded structure between a dynamic power detecting element and an object to be detected, in which an adhesive bond bonding the dynamic power detecting element formed of a ferromagnetic material with the object to be detected is formed of an adhesive and an inorganic filler having a small linear thermal expansion coefficient and incorporated in the adhesive.

With the above construction, it is possible to provide an adhesively bonded structure having an adhesive bond thin and uniform in thickness over the entire length thereof between the dynamic power detecting element and the object to be detected, thereby preventing the dispersion of detected values of the dynamic power and improving the detecting sensitivity of the dynamic power detecting element.

Further, it is possible to provide an adhesively bonded structure in which the linear thermal expansion coefficient of an adhesive bond can be reduced to avoid adverse influences on the dynamic detecting element due to expansion and shrinkage of the adhesive bond.

The above and other objects, features and advantages of the invention will become apparent from a reading of the following description of the preferred embodiments, taken in conjunction with the accompanying drawings.

BRIEF DESCRPTION OF THE DRAWINGS

FIGS. 1 to 4 illustrate a first embodiment of the present invention, wherein

FIGS. 5 to 7 illustrate a second embodiment of the present invention, wherein

FIGS. 8 and 9 illustrate a third embodiment of the present invention, wherein

DESCRIPTION OF THE PREFERRED EMBODIMENTS

A first embodiment of the present invention will now be described with reference to FIGS. 1 to 4.

Figure 1:
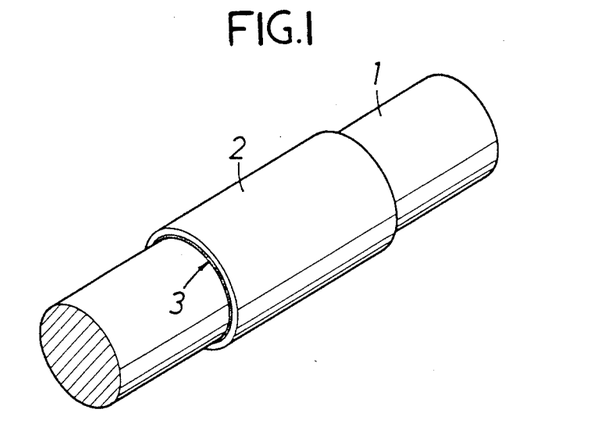
FIG. 1 is a perspective view of an adhesively bonded structure.
Figure 2:
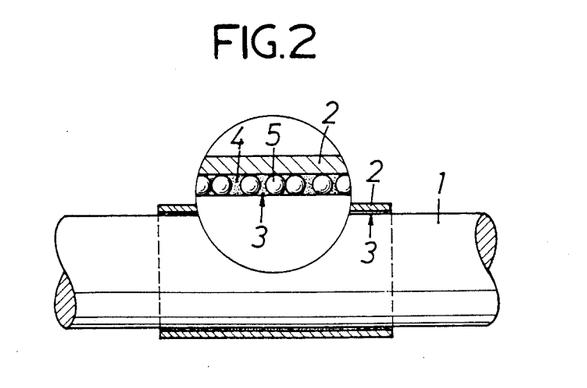
FIG. 2 is a partially enlarged sectional view of the adhesively bonded structure.

An adhesively bonded structure in this embodiment is constructed by adhesively bonding as torque detecting element 2 as a dynamic power detecting element onto an outer peripheral surface of a rotating shaft 1 as an object to be detected through an adhesive bond 3, as shown in FIGS. 1 and 2.

The rotating shaft 1 is formed from an austenite stainless steel bar (JIS SUS304) having a linear thermal expansion coefficient of $17 \times 10^{-6}/°$ C. The torque detecting element 2 is formed from a thin strip (having a thickness of about 30 $\mu$m) of a ferromagnetic material such as an Fe-Si-B based amorphous alloy having a positive magnetostriction. This alloy has a linear thermal expansion coefficient of $12 \times 10^{-6}/°$ C.

The adhesive bond 3 comprises an epoxy resin-based adhesive 4 having a linear thermal expansion coefficient of $42 \times 10^{-6}/°$ C., and a large number of glass beads 5 of a substantially uniform diameter as a microspherical inorganic filler, which are dispersed in the adhesive 4 without overlapping one on another between the torque detecting element 2 and the rotating shaft 1, i.e., in a radial direction of the rotating shaft 1. The diameter of the glass bead is of approximately 35 $\mu$m, and the linear thermal expansion coefficient thereof is of $10 \times 10^{-6}/°$ C.

To produce the adhesively bonded structure, a given amount of the glass beads are mixed and dispersed in the adhesive 4, and the resulting adhesive 4 is applied onto the outer peripheral surface of the rotating shaft 1. Then, the torque detecting element 2 is wound around the adhesive-applied portion of the rotating shaft 1 and pressed against the rotating shaft 1 to disperse the glass beads 5 between the rotating shaft 1 and the torque detecting element 2 without overlapping one on another, as described above.

With the above construction, each of the glass beads 5 controls the thickness of the adhesive and hence, the thickness of the adhesive 3 is uniform over the entire length thereof due to the substantially uniform diameter of the glass beads 5. In addition, because the diameter of each glass bead is very small, the adhesive bond 3 is also thin.

This avoids the dispersion of torque detected values and improves the detecting sensitivity of the torque detecting element 2.

The suitable content of the glass beads is in a range of 30 to 70% by volume based on the adhesive 4. However, if the content of glass beads is less than 30% by volume, such glass bead content is inadequate and hence, the intended purpose cannot be achieved. If the glass bead content is more than 70% by volume, the content of the adhesive 4 is deficient, resulting in a considerably reduced strength of the adhesive bond 3.

Figure 3:
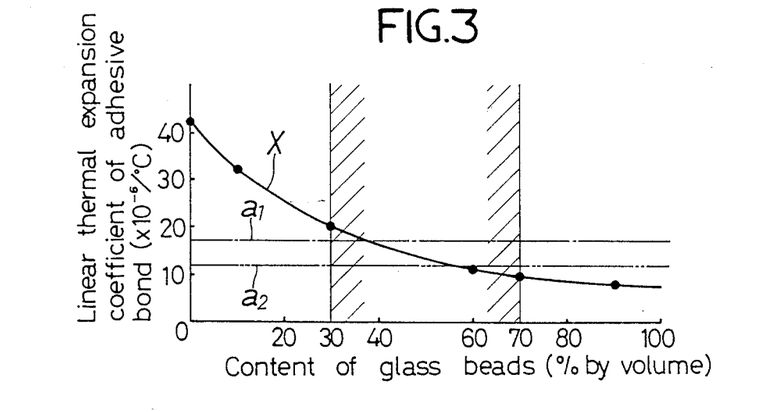
FIG. 3 is a graph illustrating a relationship between the content of glass beads in an adhesive bond and the linear thermal expansion coefficient of the adhesive bond.

A line X in FIG. 3 illustrates a relationship between the content of the glass beads in the adhesive bond 3 and the linear thermal expansion coefficient of the adhesive bond 3. In FIG. 3, a line $a_1$ corresponds to the linear thermal expansion coeffficient of the rotating shaft 1, and a line $a_2$ corresponds to the linear thermal expansion coefficient of the torque detecting element 2. The linear thermal expansion coefficient may be determined as $(\Delta l/l) \times 100/°$ C. wherein l represents the original length, and $\Delta l$ represents the elongation. A value corresponding to $1/10^6$ of such value is shown in FIG. 3. In this case, setting of the content of the glass beads 5 in a range of 30 to 70% by volume will result in a linear thermal expansion coefficient of an adhesive bond of 10 to $20 \times 10^{-6}/°$ C., which is substantially equal to the linear thermal expansion coefficient of the rotating shaft 1 made from the stainless steel bar. Accordingly, controlling of the content of glass beads 5 makes it possible to provide an adhesive bond 3 having a small linear thermal expansion coefficient equal to that of a metal.

Figure 4:
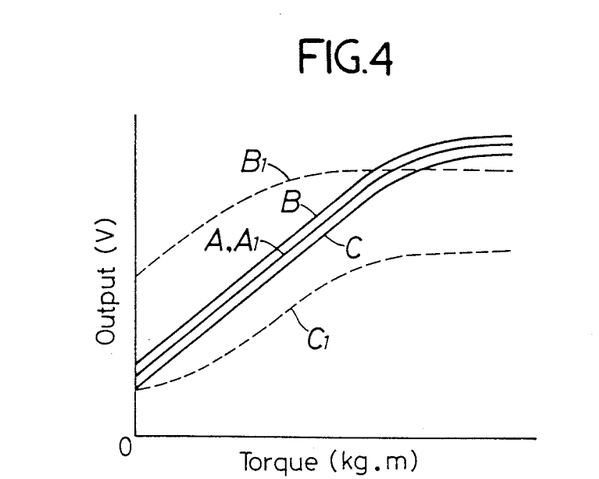
FIG. 4 is a graph illustrating a torque-output characteristic of a torque detecting element.

An adhesive bond 3 having a characteristic as shown in FIG. 3, e.g., an adhesive bond 3 comprising an adhesive 4 containing glass beads of the above-described diameter incorporated therein in a content of 40% by volume, was formed between the rotating shaft 1 made from the above-described material and the torque detecting element 2, and the temperature characteristic of the torque detecting element 2 was examined to give results shown in FIG. 4.

In a graph of torque-output characteristics shown in FIG. 4, lines A to C indicate such characteristics in which the present invention is applied, and the lines $A_1$ to $C_1$ indicate such characteristics in which prior art adhesive bonds comprising an adhesive alone are applied. The lines A and $A_1$ indicate the characteristics at a room temperature; the lines B and $B_1$ indicate the characteristics at 80° C.; and the lines C and $C_1$ indicate the characteristics at −40° C.

The torque detecting element 2 made of the amorphous alloy is required to exhibit a rectilinear torque-output characteristic, and as apparent from the lines A to C in FIG. 4, a good linearity is obtained irrespective of the temperature conditions when the present invention is applied.

This is because the adhesive bond 3 has the small linear thermal expansion similar to that of the rotating shaft 1 and hence, the amounts of expansion and shrinkage depending upon the temperature will be small, resulting in very small tensile and compression stresses attendant on the expansion and shrinkage of the adhesive bond 3 in the torque detecting element 2.

By contrast, when the prior art adhesive bond is applied, a linearity similar to that obtained when the present invention is applied is obtained under a condition of room temperature, as shown by the line $A_1$, but due to the large linear thermal expansion coefficient peculiar to the synthetic resin and possessed by the adhesive bond, the linearity is lost under a hot condition of 80° C., as shown by the line $B_1$, because a larger tensile stress attendant on the expansion of the adhesive bond is produced in the torque detecting element, while the linearity is lost at a cold condition of −40° C., as shown by the line $C_1$, because a larger compression stress attendant on the shrinkage of the adhesive bond is produced in the torque detecting element.

The glass beads 5 which can be employed are those having a given diameter selected from a range of 30 to 50 $\mu$m. In addition to the glass beads, the microspherical inorganic fillers which may be used include carbon particles, ceramic particles, etc. Fillers corresponding to such fillers are those having a linear thermal expansion coefficient and are desired to be a non-magnetic material.

Other embodiments of the present invention will be described below.

A fabric woven using an inorganic fiber or a warp and weft of such inorganic fiber is used as an inorganic filler in place of the above-described glass beads 5.

The linear thermal expansion coefficient of the inorganic fiber is sufficiently smaller than that of a commonly used adhesive. For example, the linear thermal expansion coefficient of a carbon fiber is in a range of 3 to $5 \times 10^{-6}/°$ C. with a polyacrylontrile (PAN) type, and in a range of 1.5 to $1.7 \times 10^{-6}/°$ C. with a pitch type, and the use of an organic fiber as an inorganic filler enables the linear thermal expansion coefficient of a resultant adhesive bond to be reduced.

The control of the linear thermal expansion coefficient of the adhesive bond is performed by the content of the inorganic fiber, and the linear thermal expansion coefficient of the adhesive bond is reduced with an increase in the content of the inorganic fiber, which is represented as a fiber volume fraction (Vf).

Figure 5:
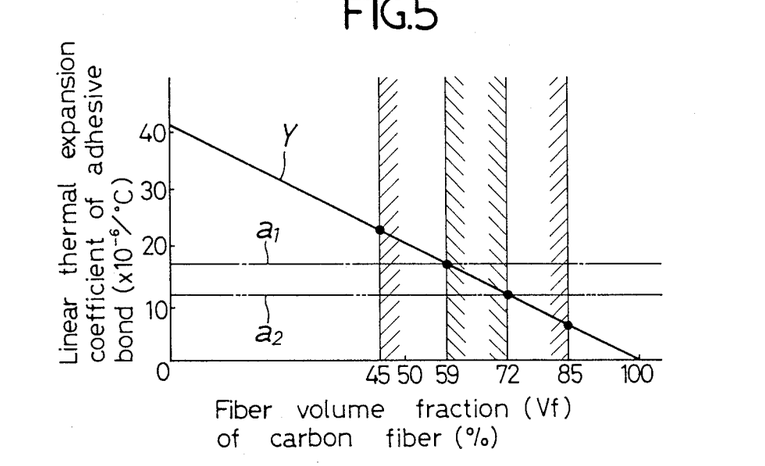
FIG. 5 is a graph illustrating a relationship between the fiber volume fraction of a carbon fiber in an adhesive bond and the linear thermal expansion coefficient of the adhesive bond.

A line Y in FIG. 5 indicates a relationship between the fiber volume fraction of the carbon fiber in a adhesive bond and the linear thermal expansion coefficient of the adhesive bond when an epoxy resin-based adhesive is used. As apparent from FIG. 5, to have a linear thermal expansion coefficient of an adhesive bond approximating the linear thermal expansion coefficient (a line $a_1$ in FIG. 5) of the rotating shaft made from the austenite stainless steel bar, the fiber volume fraction of the carbon fiber may be in a range of 45 to 85% and preferably, is set at a value in a range of 59 to 72% which corresponds to an intermediate value between the linear thermal expansion coefficient (a line $a_2$ in FIG. 5) of the torque detecting element and the linear thermal expansion coefficient (the line $a_1$ in FIG. 5) of the rotating shaft. However, if the fiber volume fraction of the carbon fiber is more than 85%, the content of the adhesive is deficient and hence, a required bonding power cannot be obtained, resulting in the torque detecting element being liable to be released.

Any of long and short fibers and whiskers can be used as the inorganic fiber. The short fiber and the whisker may be used as they are, while the long fiber may be used in the form of a woven fabric. Particularly, the woven fabric can be used in the form impregnated with an adhesive, leading to a good workability of adhesively bonding the torque detecting element. In this case, even if the adhesive is shrinked with hardening thereof, the woven fabric exhibits a function of controlling the thickness of the adhesive bond, so that the entire thickness of the adhesive can be uniformed.

The thickness of the adhesive is controlled to a range of 100 to 400 $\mu$m when the woven fabric is used. A woven fabric made of a carbon fiber is recommended. Such carbon fiber-woven fabrics woven by use of a warp and weft formed by twisting together 1,000 to 6,000 filaments having a diameter of 5 to 8 $\mu$m are commercially available. In the present invention, a woven fabric having a thickness in a range of 100 to 400 $\mu$m may be used. Such limitations is because the lower limit value of the thickness of the commercially available woven fabric is of 100 $\mu$m, and because any thickness of the fabric exceeding 400 $\mu$m will result in an increased thickness of an adhesive bond. The commercially available woven fabrics of carbon fiber include #6151B (trade name) produced by Toray Industries, Co. Ltd., and CF1101B (trade name) produced by Canebou, Co. Corp. It should be noted that the thickness of the woven fabric may be, of course, less than 100 $\mu$m.

Figure 6:
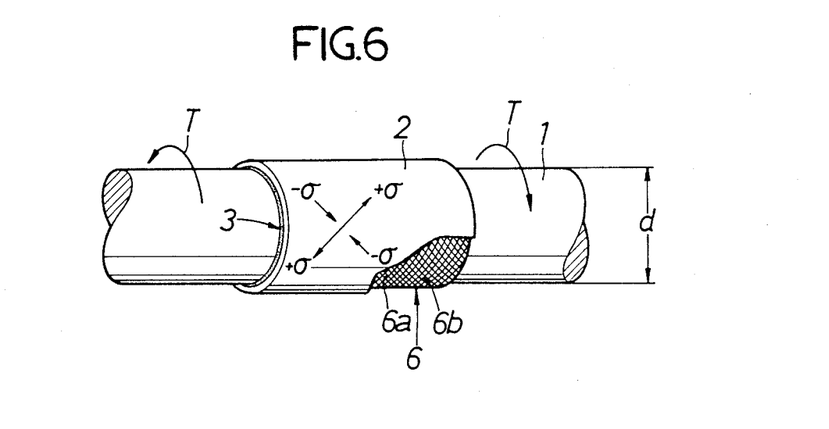
FIG. 6 is a cut-away perspective view of an essential portion of an adhesively bonded structure.
Figure 7:
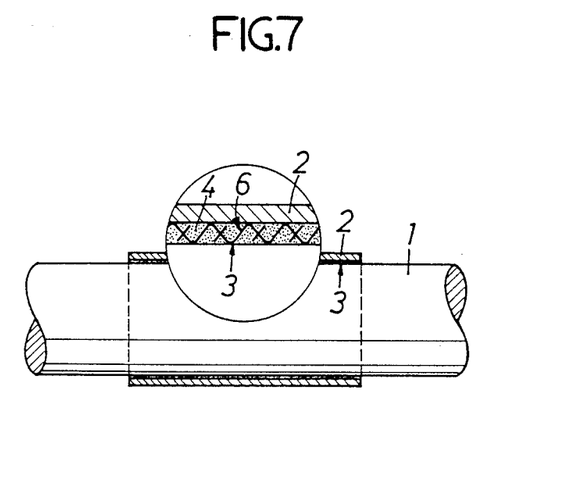
FIG. 7 is a partially enlarged sectional view of the adhesively bonded structure.

In FIGS. 6 and 7, an adhesive bond 3 is comprised of an epoxy resin-based adhesive 4 and a woven fabric 6 of carbon fiber having a thickness of 140 $\mu$m and contained in the adhesive 4. The carbon fiber woven fabric has a fiber volume fraction of 65%, and a warp 6a and a weft 6b thereof are made by twisting together 1,000 carbon filaments having a diameter of 7 $\mu$m.

In this case, each of the individual warp 6a and weft 6b of the carbon fiber woven 6 has an inclined angle of approximately 45° in respect to a circumferential direction of the rotating shaft 1, as clearly shown in FIG. 6. The reason why the warp 6a and the weft 6b are oriented in this manner is that if a torque T acts on the rotating shaft 1, a maximum stress $\sigma(+\sigma$: a tensile strain and $-\sigma$: a compression strain) is produced in the adhesive bond 3 in a direction of $+45°$ in respect to the circumferential direction thereof, such maximum stress being represented by $$\sigma = \frac{16}{rd^3} \cdot T.$$

Wherein d is an outside diameter of the rotating shaft 1. Thus, if the wrap 6a and the weft 6b are oriented as described above, the Young's modulus of the resulting adhesive bond 3 is increased in an oriented direction. Therefore, the adhesive bond 3 exhibits a behavior of deformation similar to a strain produced on the outer peripheral surface of the rotating shaft 1 by the torque T, whereby the strain of the rotating shaft 1 is accurately transmitted to the torque detecting element 2, leading to an improved detecting accuracy.

Figure 8:
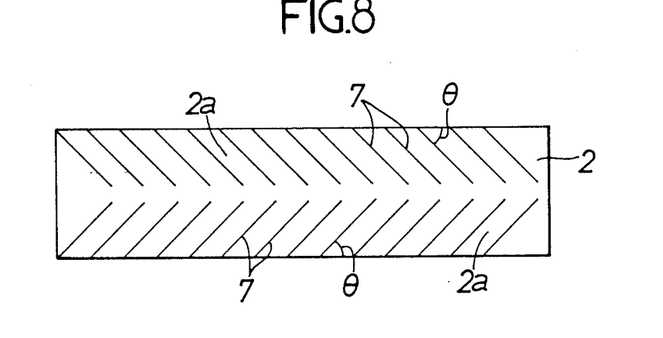
FIG. 8 is a plan view of a torque detecting element.

FIG. 8 illustrates an adhesively bonded stucture in which a large number of parallel inclined slits 7 (an incline angle $\theta = 45°$) are made in the torque detecting element 2 in a symmetrical pattern to extend from opposite side edges toward a lengthwise central portion thereof and which otherwise is similar to the embodiment shown in FIGS. 6 and 7.

Figure 9:
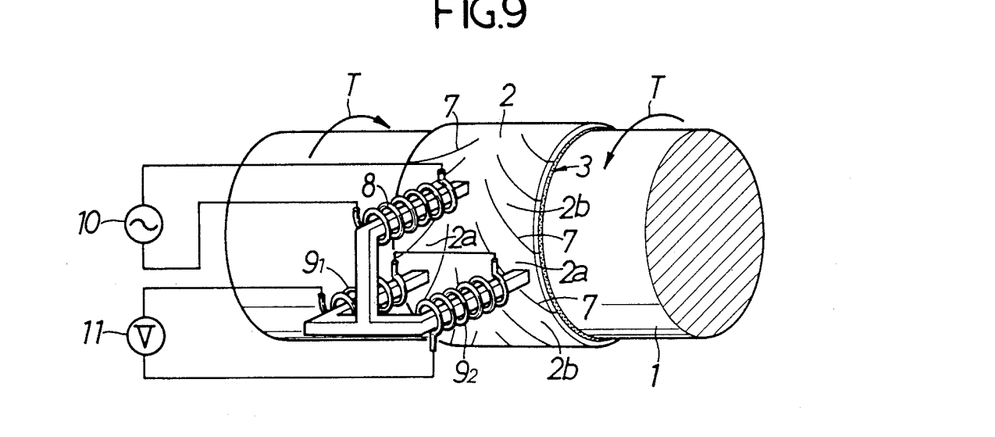
FIG. 9 is a schematic view for illustrating a torque determining method.

In measuring the torque T, an exciting coil 8 is placed substantially vertically in proximity to a central portion of the torque detecting element 2, and a pair of detecting coils $9_1$ and $9_2$ are placed substantially vertically in proximity to opposite sides of the torque detecting element 2. In this condition, a high frequency current is supplied from a power supply 10 to the exciting coil 8 to induce a voltage in the detecting coils $9_1$ and $9_2$ that is measured by a voltmeter 11.

The induced voltage varies due to a variation in permeability of the torque detecting element 2 and thus the magnitude of a tensile strain introduced into the torque detecting element 2 by the torque T of the rotating shaft 1. Thereupon, if the relationship between the permeability and the torque T has been previously examined, the magnitude of the torque can be determined by measuring the induced voltage.

With the inclined slits 7 made in the torque detecting element 2 as described above, when the induced voltage in a section 2a between the adjacent slits 7 in the torque detecting element 2 is measured, an electrical influence from a section 2b adjacent that section 2a can be intercepted by the inclined slit 7, thereby improving the measuring accuracy.

Figure 10:
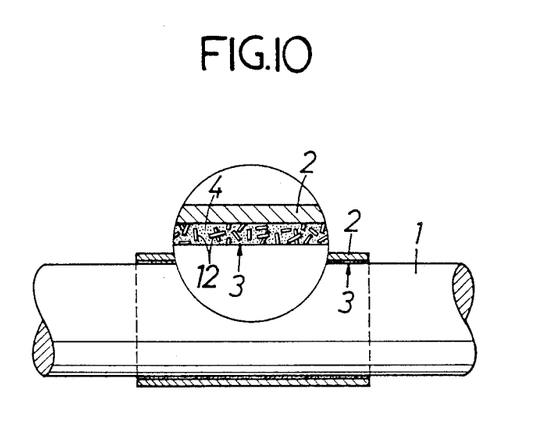
FIG. 10 is a cut-away perspective view of an essential portion of an adhesively bonded structure according to a fourth embodiment of the present invention.

FIG. 10 illustrates a further embodiment, in which an adhesive bond 3 is comprised of an epoxy resin-based adhesive 4 and short carbon fibers 12 incorporated in the adhesive 4. The fiber volume fraction of the short fibers 12 is set in the same way as in the case when the above-described woven fabric 6 is used.

What is claimed is:

1. An adhesively bonded structure between a dynamic power detecting element and an object to be detected, in which an adhesive bond bonding the dynamic power detecting element formed of a ferromagnetic material with the object to be detected is formed of an adhesive and an inorganc filler having a linear thermal expansion coefficient smaller than that of the adhesive and incorporated in said adhesive bond, and wherein the adhesive and inorganic filler are in relative proportions to produce a resultant linear thermal expansion coefficient of the combined adhesive and inorganic filler approximately equal to the linear thermal expansion coefficient of the object to be detected.

2. An adhesively bonded structure between a dynamic power detecting element and an object to be detected according to claim 1, wherein said inorganic filler is microspherical.

3. An adhesively bonded structure between a dynamic power detecting element and an object to be detected according to claim 1, wherein said inorganic filler is at least one selected from the group consisting of glass beads, carbon particles and ceramic particles.

4. An adhesively bonded structure between a dynamic power detecting element and an object to be detected according to claim 1, wherein said inorganic filler is an inorganic fiber.

5. An adhesively bonded structure between a dynamic power detecting element and an object to be detected according to claim 1, wherein said inorganic filler is a woven fabric made of an inorganic fiber.

6. An adhesively bonded structure between a dynamic power detecting element and an object to be detected according to claim 5, wherein the woven fabric has warp and weft fibers each arranged at substantially 45° to a neutral axis of stress of the object to be detected.

7. An adhesively bonded structure between a dynamic power detecting element and an object to be detected, in which an adhesive bond bonding the dynamic power detecting element formed of a ferromagnetic material with the object to be detected is formed of an adhesive and an inorganic filler having a linear thermal expansion coefficient smaller than that of the adhesive and incorporated in said adhesive bond, and wherein the adhesive and inorganic filler are in relative proportions to produce a resultant linear thermal expansion coefficient of the combined adhesive and inorganic filler substantially equal to a value between the linear thermal expansion coefficient of the object to be detected and the linear thermal expansion coefficient of the ferromagnetic material.

8. An adhesively bonded structure between a dynamic power detecting element and an object to be detected according to claim 7, wherein said inorganic filler is microspherical.

9. An adhesively bonded structure between a dynamic power detecting element and an object to be detected according to claim 7, wherein said inorganic filler is at least one selected from the group consisting of glass beads, carbon particles and ceramic particles.

10. An adhesively bonded structure between a dynamic power detecting element and an object to be detected according to claim 7, wherein said inorganic filler is an inorganic fiber.

11. An adhesively bonded structure between a dynamic power detecting element and an object to be detected according to claim 7, wherein said inorganic filler is a woven fabric made of an inorganic fiber.

12. An adhesively bonded structure between a dynamic power detecting element and an object to be detected according to claim 11, wherein the woven fabric has warp and weft fibers each arranged at substantially 45° to a neutral axis of stress of the object to be detected.

13. An adhesively bonded structure between a dynamic power detecting element and an object to be detected, in which an adhesive bond bonding the dynamic power detecting element formed of a ferromagnetic material with the object to be detected is formed of an adhesive and an inorganic filler having a linear thermal expansion coefficient smaller than that of the adhesive and incorporated in said adhesive bond, and wherein said inorganic filler is an inorganic fiber.

* * * * *